(12) United States Patent
Mueller

(10) Patent No.: US 8,220,256 B2
(45) Date of Patent: Jul. 17, 2012

(54) HYDROSTATIC DRIVE WITH BRAKING ENERGY RECOVERY

(75) Inventor: Matthias Mueller, Neusaess (DE)

(73) Assignee: Robert Bosch GmbH, Stuttgart (DE)

( * ) Notice: Subject to any disclaimer, the term of this patent is extended or adjusted under 35 U.S.C. 154(b) by 568 days.

(21) Appl. No.: 12/445,828

(22) PCT Filed: Oct. 26, 2007

(86) PCT No.: PCT/EP2007/009327
§ 371 (c)(1),
(2), (4) Date: Apr. 16, 2009

(87) PCT Pub. No.: WO2008/049635
PCT Pub. Date: May 2, 2008

(65) Prior Publication Data
US 2010/0293934 A1     Nov. 25, 2010

(30) Foreign Application Priority Data
Oct. 27, 2006 (DE) .................. 10 2006 050 873

(51) Int. Cl.
*F16D 31/02* (2006.01)
(52) U.S. Cl. ............................................. 60/414; 60/489

(58) Field of Classification Search .................... 60/413, 60/414, 487, 489, 493
See application file for complete search history.

(56) References Cited

U.S. PATENT DOCUMENTS

| | | | |
|---|---|---|---|
| 4,098,083 A * | 7/1978 | Carman | 60/414 |
| 4,215,545 A | 8/1980 | Morello et al. | |
| 4,350,220 A | 9/1982 | Carman | |
| 4,754,603 A * | 7/1988 | Rosman | 60/413 |
| 6,009,708 A * | 1/2000 | Miki et al. | 60/414 |
| 2004/0118623 A1 * | 6/2004 | Shore et al. | 180/165 |

FOREIGN PATENT DOCUMENTS

| | | |
|---|---|---|
| AT | 395 960 B | 4/1993 |
| DE | 38 15 873 A1 | 11/1989 |

* cited by examiner

*Primary Examiner* — Michael Leslie
(74) *Attorney, Agent, or Firm* — Scully, Scott, Murphy & Presser, P.C.

(57) ABSTRACT

A hydrostatic drive in an open circuit is provided. The hydrostatic drive has a hydraulic pump and a hydraulic motor. The hydraulic pump and the hydraulic motor are connected to one another via a feed line. In addition, the hydrostatic drive has a storage element for storing pressure energy. A first valve device, which is arranged downstream of the hydraulic motor, alternately connects the downstream connection of the hydraulic motor to a tank volume or to the storage element.

7 Claims, 3 Drawing Sheets

HYDROSTATIC DRIVE WITH BRAKING ENERGY RECOVERY

BACKGROUND

The invention relates to a hydrostatic drive with a device for the recovery of braking energy.

For the recovery of released energy in hydrostatic travel drives, it is known to store the released kinetic energy in the form of pressure energy. For this purpose, a hydrostatic drive in which a hydraulic pump is connected to an adjustable hydraulic motor in a closed circuit is known from AT 395 960 B. The hydraulic pump is connected to the hydraulic motor via a first working line and a second working line in the closed circuit. Connected to the first working line is a high-pressure accumulator and to the second working line a low-pressure accumulator. The second pressure accumulator has to be provided here for volume flow equalisation, since the high-pressure accumulator is filled up in the case of a recovery of released kinetic energy by the hydraulic motor then acting as a pump.

The drive known from AT 395 960 B has the disadvantage that a reversal of the flow direction is required in order that, on the side of the hydraulic motor, the high pressure is always present at the same connection of the hydraulic motor. The arrangement proposed in AT 395 960 B is thus not transferable to travel drives having an open circuit.

SUMMARY

One aspect of the invention is to provide a hydrostatic drive having an open circuit, in which a simple recovery of released energy is possible.

In the case of the hydrostatic drive according to the invention, a hydraulic pump and a hydraulic motor are connected to one another via a delivery line. The hydrostatic drive has an accumulator element for storing pressure energy. The hydraulic pump and the hydraulic motor are arranged in an open circuit and a downstream connection of the hydraulic motor can be alternately connected to a tank volume or to the accumulator element via a first valve device.

In the case of the hydrostatic drive according to the invention, the downstream connection of the hydraulic motor is connected to an accumulator element via a valve device when, for example, a deceleration of the vehicle in the case of a travel drive takes place. The vehicle goes into overrun condition and the hydraulic motor acts as a pump. Since the flow direction does not reverse here, the downstream connection of the hydraulic motor is connected to the accumulator element by the valve device. Instead of a relief to the tank volume, pressure medium is thus delivered to the accumulator element under increasing pressure. The kinetic energy is thus converted into pressure energy and is available again for subsequent acceleration processes.

As a result of the hydrostatic drive being designed with an open circuit, simultaneously the pressure medium delivered into the accumulator element is sucked out of the tank volume on the suction side of the hydraulic pump, so that a volume flow equalisation automatically takes place. Consequently, a second pressure accumulator, as required for the volume flow equalisation in closed circuits, does not have to be provided.

As a result of the arrangement of the valve device and the accumulator in accordance with the invention, a recovery of energy is also possible in an open circuit.

In particular, it is advantageous to provide a second valve device, via which a suction connection of the hydraulic pump can be alternately connected to the accumulator element or a tank volume. While a filling of the accumulator element in overrun condition is effected by the hydraulic motor by way of the first valve device, in the case of a connection of the suction connection of the hydraulic pump the recovery of the stored pressure energy is possible via the suction connection of the hydraulic pump. This results in an energy saving owing to the reduced pressure difference between the suction side and the delivery-side connection of the hydraulic pump.

In particular, it is advantageous when not only the hydraulic motor can be connected to the accumulator and the hydraulic pump to the accumulator element by the first valve device and the second valve device, but also when simultaneously the hydraulic motor and the hydraulic pump can be connected to one another in a closed circuit. If the accumulator element has reached its capacity limit and a further storage of energy is no longer possible, a further braking of a vehicle can then take place through the engine braking effect of the engine connected to the hydraulic pump. For this purpose, a closed circuit of the hydraulic pump with the hydraulic motor is produced, so that the hydraulic motor acting as a pump is supported by a primary driving engine.

According to a further preferred embodiment, the accumulator element is connected to a pressure limiting valve. If a braking torque cannot be produced by the driving engine, a further braking by filling up the accumulator element is, however, likewise not possible, and so the pressure medium delivered by the hydraulic motor is relieved to the tank volume via the pressure limiting valve. The released kinetic energy which can no longer be stored is thus converted into heat. Since the pressure limiting valve is connected to the accumulator, a switching of the first valve device during a braking procedure is not required in this case. Rather, the pressure limiting valve is automatically opened when a maximum pressure is reached in the accumulator element and thus the pressure medium is relieved to the tank volume via the pressure limiting valve while generating heat.

Preferably, the delivery line of the open hydrostatic circuit can be connected to a first and a second hydraulic motor line via a direction-of-travel valve, so that a change of the direction of travel is achieved by changing that connection of the hydraulic motor which is subjected to high pressure. In this case, it is particularly preferred when simultaneously the hydraulic motor line respectively not connected to the delivery line is connected to a tank line by the direction-of-travel valve. According to a particularly preferred embodiment, the first valve device is arranged in the tank line. In this way, both for forward travel and for rearward travel, the respectively downstream connection of the hydraulic motor can be connected to the accumulator element via the direction-of-travel valve and the tank line and also the valve device. A storage of released kinetic energy is thus possible both during forward travel and during rearward travel.

According to a further preferred embodiment, the first valve device or else the first and the second valve device is connected to the accumulator element via an accumulator line. A throttling point is arranged in this accumulator line to increase a braking effect during the filling of the accumulator element. It is particularly preferred to design the throttling point so as to be controllable. By virtue of the throttling point, a braking effect can be achieved even when the accumulator element is still largely empty and thus the counterpressure for the hydraulic motor acting as a pump is still low.

A seamless transition on discharging the accumulator element to the suction side of the hydraulic pump can be realised particularly in the case of an adjustable throttle. The pressure acting on the suction-side connection of the hydraulic pump is thus adjustable and a reduction of the pressure can be effected towards the end of the recovery process. Simultaneously, the power which is delivered to the pump by the driving engine, is increased and there is no interruption of the tractive force during an acceleration phase, which consists of the recovery of the released kinetic energy and a subsequent normal acceleration procedure.

BRIEF DESCRIPTION OF THE DRAWINGS

Advantageous embodiments of the hydrostatic drive according to the invention are illustrated in the drawing, in which.

DETAILED DESCRIPTION OF EXEMPLARY EMBODIMENTS

Figure 1:
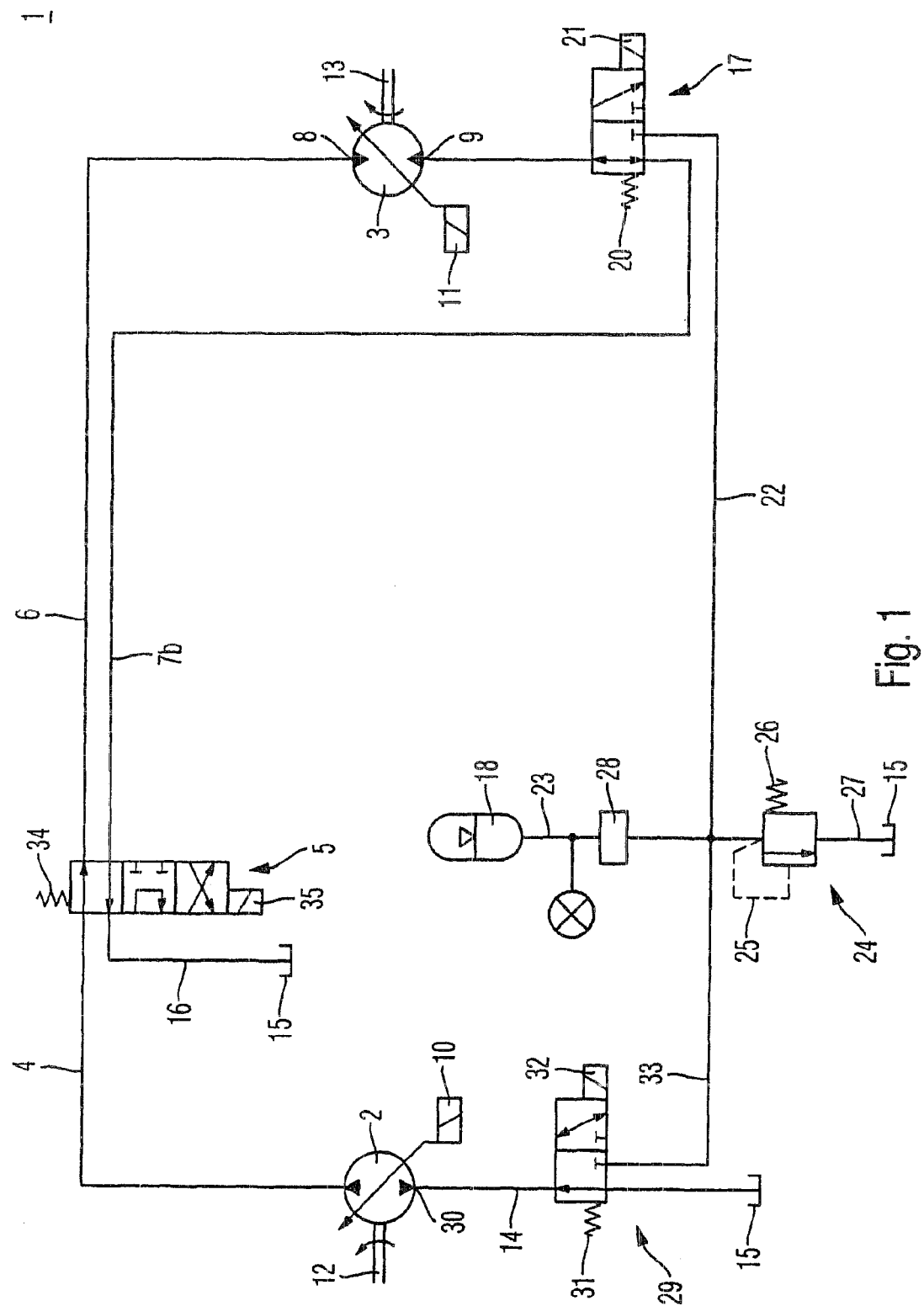
FIG. 1 shows a first exemplary embodiment of a hydrostatic drive according to the invention.

Illustrated in FIG. 1 is a hydraulic circuit diagram of a first exemplary embodiment of a hydrostatic drive according to the invention. The hydrostatic drive is a travel drive 1 of a vehicle driven by means of a hydrostatic transmission. Such vehicles may be wheeled loaders, stackers or refuse vehicles, for example. In the case of such vehicles, particularly intensive driving cycles occur, i.e. acceleration and braking procedures are frequently repeated and as a rule shortly after one another. Therefore, in the case of these types of vehicles, a recovery of the released energy during a braking procedure is of particular interest.

The travel drive 1 comprises a hydraulic pump 2 and a hydraulic motor 3. The hydraulic pump 2 and the hydraulic motor 3 are arranged in an open hydraulic circuit. The hydraulic pump 2 delivers pressure medium to a delivery line 4 which is connected to the hydraulic pump 3 at its delivery-side connection. The delivery line 4 is connected to a first hydraulic motor line 6.

Via the delivery line 4 and the first hydraulic motor line 6, a first connection 8 of the hydraulic motor 3 can be subjected to the delivery pressure produced by the hydraulic pump 2. On account of the delivery pressure present at the first connection 8, the hydraulic motor 3 produces an output torque which acts on a vehicle drive (not illustrated further). The pressure medium, relieved after flowing through the hydraulic motor 3, is supplied, via a second connection 9 of the hydraulic motor 3, to a second hydraulic motor line 7 which comprises a first section 7a and a second section 7b in the exemplary embodiment illustrated. The second hydraulic motor line 7 is connected to a tank volume 15 via a tank line 16.

For reversal of the direction of travel, a direction-of-travel valve 5 is provided. By means of the direction-of-travel valve 5, the delivery line 4 can be connected either to the first hydraulic motor line 6 or else to the second section 7b of the second hydraulic motor line 7. Illustrated in FIG. 1 is the starting position of the direction-of-travel valve 5, which is defined by the force of a compression spring 34. A second end position of the direction-of-travel valve 5 can be set by means of a first electromagnet 35 counter to the force of the compression spring 34. In the second end position of the direction-of-travel valve 5, the delivery line 4 is connected to the second hydraulic motor line 7 or the second section 7b of the second hydraulic motor line 7. Simultaneously, the first hydraulic motor line 6 is connected to the relief line 16.

In a middle position of the direction-of-travel valve 5, the delivery line 4 is directly connected to the tank line 16.

If the direction-of-travel valve 5 is in a second end position during the energising of the first electromagnet 35, the flow direction through the hydraulic motor 3 and thus the direction of rotation of a drive shaft 13 connected to the hydraulic motor 3 reverses.

To set the transmission ratio of the hydrostatic transmission, which comprises the hydraulic pump 2 and the hydraulic motor 3, a first adjusting device 10 and a second adjusting device 11 are provided. The first adjusting device 10 acts on an adjusting mechanism of the hydraulic pump 2 and sets the delivery volume of the hydraulic pump 2.

The second adjusting device 11, in contrast, correspondingly cooperates with an adjusting mechanism of the hydraulic motor 3 and sets the absorbing volume of the hydraulic motor 3. The transmission ratio of the hydrostatic transmission can be continuously adjusted in dependence on the set delivery volume of the hydraulic pump 2 and the set absorbing volume of the hydraulic motor 3.

The pressure medium delivered to the delivery line 4 by the hydraulic pump 2 in dependence on the set delivery volume is sucked in from the tank volume 15 via a suction line 14 by the hydraulic pump 2. The suction-side connection 30 of the hydraulic pump 2 is, for this purpose, connected to the tank volume 15 via the suction line 14 and sucks in pressure medium from the unpressurised tank volume 15.

For the following statements, it will be initially assumed that the direction-of-travel valve 5 is in its rest position, in which the delivery line 4 is connected to the first hydraulic motor line 6. The direction of travel thereby selected is referred to hereinafter as forward travel.

If the vehicle goes into an overrun condition during forward travel, for example when it is travelling on a downhill stretch or else undergoing deceleration, the hydraulic motor 3 is driven via the output shaft 13 on account of the mass inertia. Owing to the absorbing volume, set by the second adjusting device 11, differing from zero, the hydraulic motor 3 now acts as a pump and sucks in pressure medium at its first connection 8 and delivers it to the first section 7a of the hydraulic motor line 7 via its second connection 9.

According to the invention, there is provided a first valve device 17, via which the first section 7a of the second hydraulic motor line 7 can be connected to a first connecting line 22. For this purpose, starting from its rest position, the first valve device 17 is moved to a switching position counter to the force of a spring 20 by a second electromagnet 21. The first connecting line 22 is connected to an accumulator element 18 via an accumulator line 23. The accumulator element 18 is preferably embodied as a high-pressure hydraulic diaphragm accumulator. The hydraulic diaphragm accumulator has a compressible volume, so that pressure medium can be supplied to the accumulator element 18 while increasing the pressure in the compressible volume. In this way, pressure medium can be delivered to the accumulator element 18 and energy in the form of pressure energy can be stored.

In overrun condition during forward travel, pressure medium is consequently sucked in from the first hydraulic motor line 6 by the hydraulic motor 3 and delivered to the accumulator element 18 via the first section 7a of the second hydraulic motor line, the first valve device 17, the first connecting line 22 and the accumulator line 23.

While the accumulator element 18 is being filled in the manner described above, a second valve device 29 is still in its starting position, illustrated in FIG. 1. This starting position is defined by a further spring 31. In this starting position, a throughflow-enabling connection is established in the second valve device 29, which connects the suction-side connection 30 to the tank volume 15. A third electromagnet 32 can move the second valve device 29 to its opposite switching position counter to the force of the further spring 31. In the opposite switching position, the suction-side connection 30 is connected to a second connecting line 33. Simultaneously, the suction line 14 is interrupted, so that there is no longer a connection between the suction-side connection 30 and the tank volume 15.

If the first valve device 17 is in its switching position and the second valve device 29 is in its starting position, the pressure medium delivered by the hydraulic motor 3 is firstly delivered to the accumulator element 18. When the capacity limit of the accumulator element 18 is reached, a pressure limiting valve 24 connected to the accumulator element 18 opens. The accumulator line 23 can, for this purpose, be connected to the tank volume 15 via a pressure limiting line 27 and the pressure limiting valve 24. The pressure prevailing in the accumulator element 18 or the accumulator line 23 is supplied to a measuring surface of the pressure limiting valve 24 via a measuring line 25. If this accumulator pressure exceeds a critical value, which is set by an oppositely acting pressure limiting valve spring 26, the pressure limiting valve 24 opens and relieves the accumulator line 23 and thus the accumulator 18 to the tank volume 15.

Thus, if in the event of a prolonged braking procedure a pressure were consequently to be reached, as a result of the hydraulic motor 3, in the accumulator element 18 for which the accumulator element 18 is not designed, the pressure limiting valve 24 opens beforehand and the pressure medium delivered by the hydraulic motor 3 is relieved to the tank volume 15. In the process, the released kinetic energy of the braking procedure is converted into heat.

If the accumulator element 18 is filled on account of a preceding braking procedure, the pressure energy stored there can be utilised for a subsequent acceleration procedure. For this purpose, the first valve device 17 is moved to its starting position again, which is defined by the second compression spring 20. The first section 7a of the second hydraulic motor line 7 is thus connected to the second section 7b of the second hydraulic motor line 7 again. To recover the pressure energy stored in the accumulator element 18, the second valve device 29 is now moved to its switching position. By energising the third electromagnet 32, the compression spring 31 is compressed and the second connecting line 33 is connected to the suction-side connection 30 of the hydraulic pump 2. The accumulator pressure prevailing in the accumulator element 18 is thus present at the suction-side connection 30 of the hydraulic pump 2. The energy which has to be produced by a driving engine (not illustrated) connected to the hydraulic pump 2 via a driving shaft 12 is reduced on account of the smaller pressure difference between the suction side and the pressure side of the hydraulic pump 2.

As a further possibility for carrying out a braking procedure, the first valve device 17 and the second valve device 29 can be moved simultaneously to their respective switching positions. For this purpose, the second electromagnet 21 and the third electromagnet 32 are energised and thus the two valve devices 17, 29 are each moved to their second switching position. In this second switching position, the second connection 9 of the hydraulic motor 3 is connected to the suction-side connection 30 of the hydraulic pump 2 and a closed hydraulic circuit results. In a closed hydraulic circuit, the hydraulic motor 3 acting as a pump is supported by the driving engine connected to the hydraulic pump 2 via the driving shaft 12, given an appropriate setting of the delivery volume of the hydraulic pump 2 and the absorbing volume of the hydraulic motor 3.

If, therefore, the accumulator element 18 is already full and a development of heat at the pressure limiting valve 24 is to be prevented, there is also the possibility of actuating the valve device 17 and the valve device 29 simultaneously and thus utilising the available braking power of a primary driving engine (not illustrated in FIG. 1).

Furthermore, it is possible to influence the braking performance by arranging a throttling point 28 in the accumulator line 23 connecting the first connecting line 22 and the second connecting line 33 to the accumulator element 18. The throttling point 28 is preferably embodied as an adjustable throttle. In particular, the flow resistance counteracting the pressure medium delivered by the hydraulic motor 3 can be adjusted by an adjustable throttle of the throttling point 28. This enables a greater braking effect even when the accumulator element 18 produces a low counterpressure on account of a preceding withdrawal of pressure medium from the accumulator element 18.

On the withdrawal of pressure medium from the accumulator element 18, too, the adjustable throttle 18 can be advantageously utilised. In order to enable a seamless and smooth transition to accelerated motion by means of power made available by the driving engine, the pressure medium is withdrawn from the accumulator element 18 via the throttling point 28. A throttling can take place here in particular while a high pressure prevails in the accumulator element 18, so that the pressure increase on the suction side of the hydraulic pump 2 does not lead to a switching jolt. By increasing opening of the throttling point 28 during the withdrawal of pressure medium from the accumulator element 18, it is possible here to make available a constant inlet pressure at the suction-side connection 30 of the hydraulic pump 2.

In FIG. 1 a simple exemplary embodiment of the travel drive 1 according to the invention is illustrated. Here, a storage of energy is possible only in a braking procedure during forward travel. If, in contrast, the direction-of-travel valve 5 is actuated in such a way that pressure medium flows through the hydraulic motor 3 in the reverse direction, the released kinetic energy in a braking procedure cannot be stored in the accumulator element 18 in the form of pressure energy.

Figure 2:
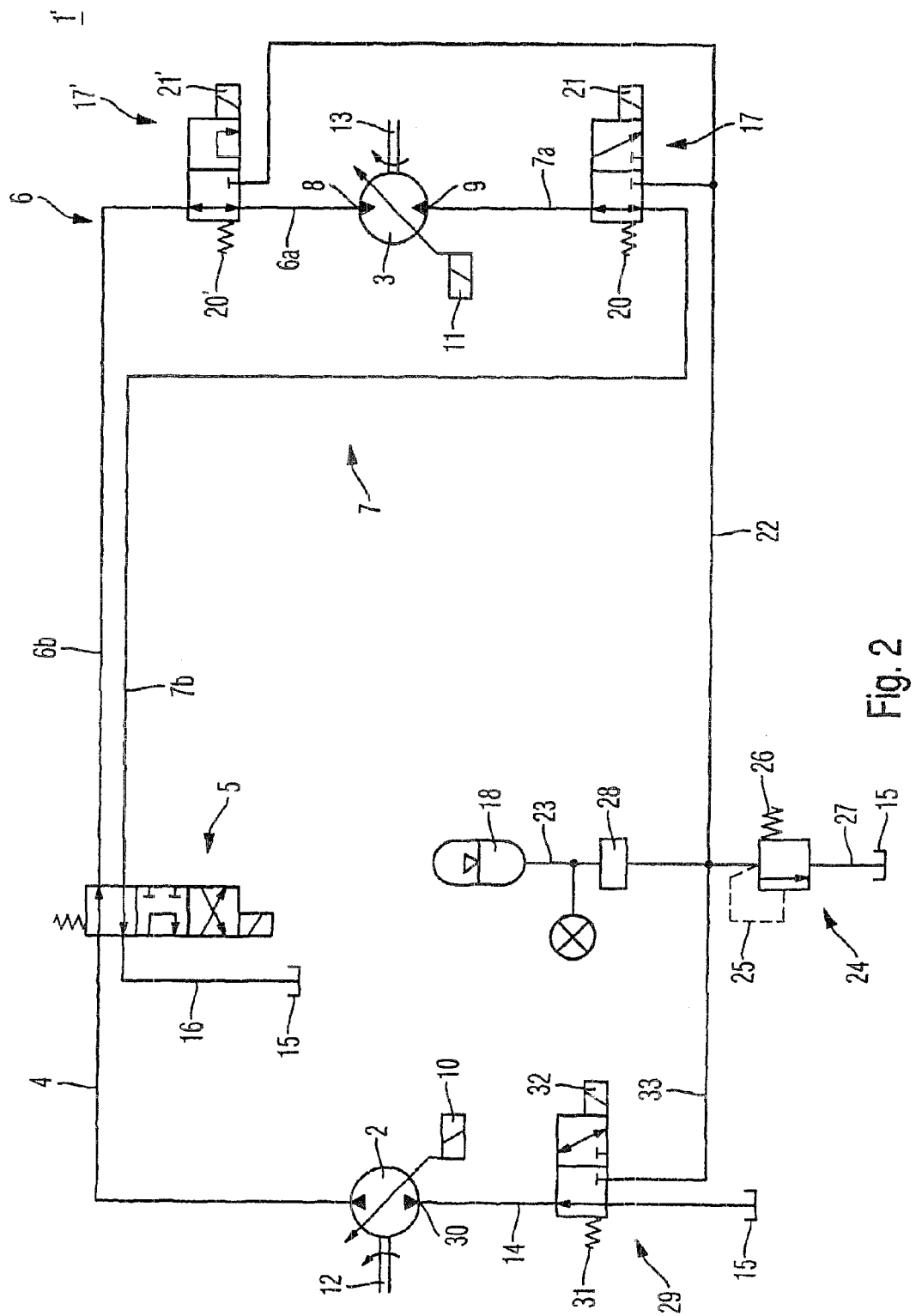
FIG. 2 shows a second exemplary embodiment of a hydrostatic drive according to the invention.

In FIG. 2 there is illustrated an exemplary embodiment with which a storage of the released kinetic energy is also possible during rearward travel. For this purpose, there is arranged in the first hydraulic motor line 6 an additional first valve device 17', which produces a throughflow-enabling connection in the first hydraulic motor line 6 during normal driving. The additional first valve device 17' is constructed like the first valve device 17. The corresponding reference symbols are shown as primed reference symbols with regard to the additional first valve device 17'. If the additional first valve device 17' is moved to its switching position by the electromagnet 21', the first connection 8 of the hydraulic motor 3 is connected to the first connecting line 22 and thus to the accumulator element 18. Otherwise, the procedure for charging the accumulator element 18 or for braking via the pressure limiting valve 24 corresponds to the procedure already explained in detail with reference to FIG. 1. Likewise, on account of an energising of the electromagnet 21' of the additional first valve device 17' and the simultaneous energising of the third electromagnet 32 of the second valve device 29, a closed hydraulic circuit can also be produced during rearward travel. The engine braking effect of the driving engine can thus also be utilised during rearward travel.

Through the additional first valve device 17', the first hydraulic motor line 6 is divided into a first section 6a and a second section 6b. The first section 6a is connected to the hydraulic motor 3. The second section 6b is arranged between the additional first valve device 17' and the direction-of-travel valve 5.

Figure 3:
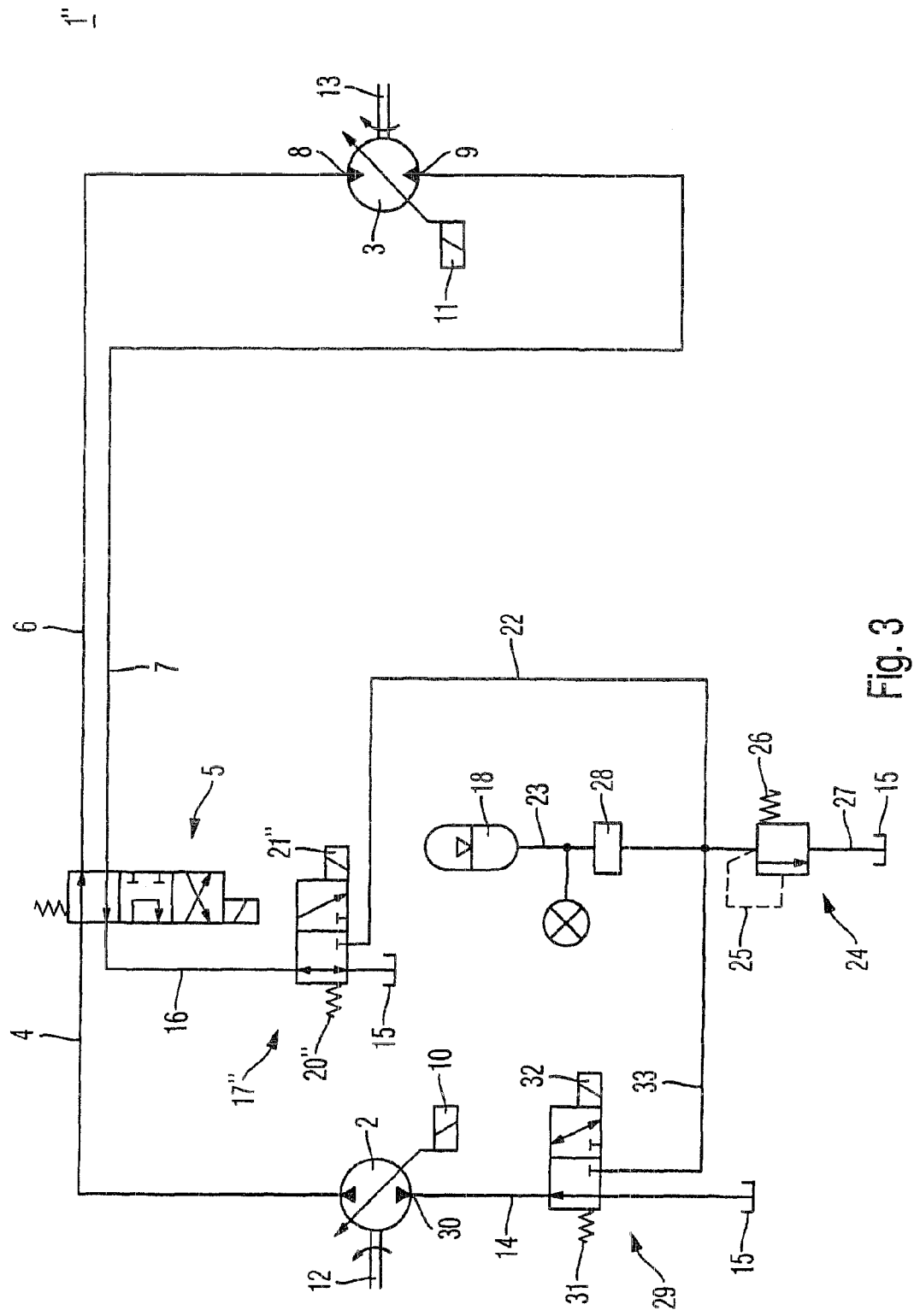
FIG. 3 shows a third exemplary embodiment of a hydrostatic drive according to the invention.

A further possibility of enabling the recovery of released kinetic energy and storage in the form of pressure energy in the accumulator element 8 is illustrated in FIG. 3. The exemplary embodiment illustrated in FIG. 3 makes use of the fact that the same tank line 16 is used to carry off the pressure medium relieved via the hydraulic motor 3 in normal driving. The first valve device 17" is therefore arranged downstream of the direction-of-travel valve 5 in the tank line 16. Therefore, when the second electromagnet 21" is energised, the connection from the direction-of-travel valve 5 to the tank volume 15 is interrupted and the tank line 16 is connected to the first connecting line 22. The exemplary embodiment of FIG. 3 has the advantage that a recovery of braking energy is possible in a simple manner both during forward travel and during rearward travel. For this purpose, only one first valve device 17" is required and the double design of the valves in the first and in the second hydraulic motor line 6, 7 can be dispensed with.

Instead of using the sliding valves illustrated as the valve devices, seat valves, in particular logic valves, which are particularly inexpensive, may also be used.

The invention is not limited to the exemplary embodiments illustrated. Rather, individual features of the exemplary embodiments may also be combined with one another.

The invention claimed is:

1. A hydrostatic drive comprising:
    a hydraulic pump and a hydraulic motor, the hydraulic pump and the hydraulic motor being connected to one another via a delivery line,
    an accumulator element,
    wherein the hydraulic pump and the hydraulic motor are arranged in an open circuit,
    a downstream connection of the hydraulic motor connected to one of a tank volume or the accumulator element via a first valve device, and
    a suction connection of the hydraulic pump connected to one of the accumulator element or the tank volume via a second valve device.

2. The hydrostatic drive according to claim 1,
    wherein the hydraulic motor and the hydraulic pump can be connected to one another in a closed circuit by the first valve device and the second valve device.

3. The hydrostatic drive according to claim 1,
    wherein the accumulator element is connected to a pressure limiting valve.

4. The hydrostatic drive according to claim 1,
    wherein the delivery line can be connected to the hydraulic motor by a direction-of-travel valve via a first hydraulic motor line or a second hydraulic motor line.

5. The hydrostatic drive according to claim 4,
    wherein the second hydraulic motor line or first hydraulic motor line not connected to the delivery line by the direction-of-travel valve is connected to a tank line.

6. The hydrostatic drive according to claim 5,
    wherein the accumulator element can be connected to the tank line by the first valve device.

7. The hydrostatic drive according to claim 1,
    wherein the first valve device or the first and second valve devices are connected to the accumulator element via an accumulator line, and a throttling point is arranged in the accumulator line.

* * * * *